United States Patent

Itaya et al.

(10) Patent No.: US 6,841,300 B2
(45) Date of Patent: Jan. 11, 2005

(54) ELECTROLYTE FOR A NONAQUEOUS BATTERY

(75) Inventors: Masaharu Itaya, Kobe (JP); Masahide Miyake, Kobe (JP); Masahisa Fujimoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/738,113

(22) Filed: Dec. 18, 2003

(65) Prior Publication Data

US 2004/0131933 A1 Jul. 8, 2004

(30) Foreign Application Priority Data

Dec. 19, 2002 (JP) ........................................ 2002-367481

(51) Int. Cl.$^7$ ................................................ H01M 6/04
(52) U.S. Cl. ........................ 429/188; 429/103; 429/203; 429/329; 429/330; 429/331; 429/332; 429/333; 429/335; 429/337; 429/338; 429/341; 429/342; 252/62.2
(58) Field of Search ................................. 429/188, 329, 429/330, 331, 332, 333, 335, 337, 338, 341, 342, 199, 201, 203, 103; 252/62.2

(56) References Cited

U.S. PATENT DOCUMENTS

| 5,650,244 A | * | 7/1997 | Shoji et al. ................. 429/337 |
| 6,350,545 B2 | | 2/2002 | Fanta et al. ................. 429/307 |
| 2002/0039677 A1 | * | 4/2002 | Iwamoto et al. ............ 429/338 |

FOREIGN PATENT DOCUMENTS

| JP | 08-321305 A | 12/1996 |
| JP | 11-209338 A | 8/1999 |
| JP | 2002-270244 A | 9/2002 |

OTHER PUBLICATIONS

Aurbach, D. et al., "The Electrochemical Behavior of Calcium Electrodes in a Few Organic Electrolytes", *Journal of the Electrochemical Society*, vol. 138, No. 12, Dec. 1991, pp. 3536–3545.

* cited by examiner

Primary Examiner—Laura Weiner
(74) Attorney, Agent, or Firm—Kubovcik & Kubovcik

(57) ABSTRACT

An electrolyte containing calcium bistrifluoromethanesulfonimide $[Ca((CF_3SO_2)_2N)_2]$ for a nonaqueous battery. The calcium bistrifluoromethanesulfonimide is soluble in an organic solvent and a molten salt having a melting point of not greater than 60° C.

4 Claims, No Drawings

ELECTROLYTE FOR A NONAQUEOUS BATTERY

FIELD OF THE INVENTION

The present invention relates to an electrolyte useful for a nonaqueous battery such as a calcium ion battery and a nonaqueous battery containing the electrolyte.

BACKGROUND OF THE INVENTION

A lithium ion battery has been used practically as a battery having high energy density. As an active material having a high energy density as great as lithium, attention is being paid to calcium and magnesium.

However, there are few calcium salts and magnesium salts soluble in an organic solvent. Regarding calcium salts, only calcium perchlorate has been studied (J. Electrochem. Soc. Vol. 138, pp. 3356–3545 (1991), D. Surbach, R. Skaletsky and Y. Gofer, "The Electrochemical Behavior of Calcium Electrodes in a Few Organic Electrolytes").

A perchlorate is the most stable among chlorates (oxygen acid chloride). Some perchlorates, however, explode by high heat or shock. There also is a risk of an explosion when the perchlorate is heated or is ground in the presence of a combustible material.

Calcium perchlorate is one of the perchlorates having a characteristic as described above. Therefore, there is a great obstacle to using it as an electrolyte for a battery because of the risk involved. A calcium salt which is capable of being handled safely and of being dissolved in an organic solvent has been looked for use in an electrolyte for a calcium ion battery.

OBJECT OF THE INVENTION

An object of the present invention is to provide an electrolyte for a nonaqueous battery such as a calcium ion battery and a nonaqueous battery comprising the electrolyte.

SUMMARY OF THE INVENTION

The present invention is characterized by comprising an electrolyte including calcium bistrifluoromethanesulfonimide [$Ca((CF_3SO_2)_2N)_2$].

DETAILED EXPLANATION OF THE INVENTION

In Japanese Patent Laid-open publication No. 11-209338, calcium bistrifluoromethanesulfonimide is prepared by a reaction of calcium hydroxide and triethylammonium bis-trifluoromethanesulfonimide. The publication describes that sulfonimide compounds are useful as a Lewis acid catalyst and ion conductive material in a field of organic synthesis and electrolytes and the like. However, there is no disclosure in the publication that calcium bistrifluoromethanesulfonimide is soluble in an organic solvent.

The present invention is based on the discovery by the inventors that calcium bistrifluoromethanesulfonimide is soluble in an organic solvent and has a conductivity of $10^{-3}$ $Scm^{-1}$ which is sufficient for an electrolyte of a battery.

The electrolyte for a nonaqueous battery of the present invention is a solution of calcium bistrifluoromethanesulfonimide in an organic solvent and/or a molten salt having a melting point of not greater than 60° C.

The electrolyte of the present invention can be used for a nonaqueous battery including a calcium ion primary battery, a calcium ion secondary battery, and the like.

As the organic solvent in which calcium bistrifluoromethanesulfonimide can be dissolved, cyclic carbonates, chain carbonates, cyclic ethers, chain ethers, cyclic esters, chain esters, and the like, can be illustrated. They can be used alone or in combinations thereof.

As the cyclic carbonates, ethylene carbonate (EC), propylene carbonate (PC), butylene carbonate (BC), trifluoropropylene carbonate (TFPC), fluoroethylene carbonate (FEC), and the like, can be illustrated. As the chain carbonates, dimethyl carbonate (DMC), diethyl carbonate (DEC), methylethyl carbonate (MEC), and the like, can be illustrated. As the cyclic ethers, sulfolane(SL), tetrahydrofuran (THF), crown ether (12-crown 4, 15-crown 5, 18-crown 6), and the like, can be illustrated. As the chain ethers, dimethoxyethane (DME), ethoxymethoxyethane (EME), diethoxyethane (DEE), diglyme, triglyme, tetraglyme, and the like can be illustrated. As the cyclic esters, γ-butyrolactone (γ-BL), valerolactone (VL), angelicalactone (AL), and the like, can be illustrated. As the chain esters, methyl formate (MF), methyl acetate (MA), methyl propionate (MP) and the like, can be illustrated.

As the molten salt having a melting point of not greater than 60° C., a salt comprising a cation selected from the group consisting of ammonium, imidazolium, pyrazolium, triazolium, thiazolium, oxazolium, pyridinium, pyridazinium, pyrimidinium and pyrazinium, and an anion selected from $BR_4^-$, $PR_6^-$, $RSO_3^-$, $(RSO_2)_2N^-$ and $(RSO_2)_3C^-$ (wherein R is alkyl or aryl containing halogen, $CF_3$, $C_2F_5$, or other electron attractive group) can be used. Concretely, as the ammonium salt, trimethylpropylammonium-bis (trifluoromethanesulfonyl) imide (TMPA-TFSI), as the imidazolium salt, 1-ethyl-3-methylimidazolium-2,2,2-trifluoro-N-(trifluoronethylslfonyl)acetamide, as the pyrazolium salt, 1,2-dimethyl-4-fluoropyrazolium-tetrafluoroborate, and as the pyridinium salt, 1-ethylpyridinium-2,2,2-trifluoro-N-(trifluoromethylsulfonyl)acetamide, can be illustrated.

There is no limitation with respect to an amount of calcium bistrifluoromethanesulfonimide dissolved in the organic solvent or molten salt. The amount is that amount which provides necessary conductivity, for example, $10^{-3}$ $Scm^{-1}$.

A method of manufacturing calcium bistrifluoromethanesulfonimide used in the present invention is characterized in that calcium carbonate and an imide compound are reacted. Calcium bistrifluoromethanesulfonimide can be prepared by a reaction of calcium carbonate and trifluoromethanesulfonimide.

In Japanese Patent Laid-open publication No. 11-209338, calcium hydroxide and trifluoromethanesulfonimide are reacted. However, when calcium hydroxide is used, generation of heat is high, handling is complicated and handling of calcium hydroxide itself is dangerous. On the other hand, when calcium carbonate is reacted with trifluoromethanesulfonimide, heat generation is less than that from the reaction of calcium hydroxide and trifluoromethanesulfonimide. Therefore, a process of cooling can be eliminated to simplify the process. Avoiding calcium hydroxide, a strong alkali, significantly reduces danger.

DESCRIPTION OF PREFERRED EMBODIMENT

Embodiments of the present invention are explained in detail below. It is of course understood that the present invention is not limited to these embodiments and can be modified within the spirit and scope of the appended claims.

EXAMPLE

Trifluoromethanesulfonimide (($CF_3SO_2)_2NH$, hereinafter HTFSI) was dissolved in water to make a 1 mol/l (1M) solution. Calcium carbonate ($CaCO_3$) was added to the solution with stirring to a molar ratio of 2:1 (HTFSI:$CaCO_3$). A reaction of calcium carbonate and HTFSI produced calcium bistrifluoromethanesulfonimide, carbon dioxide and water as shown below:

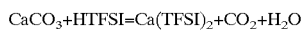

$CaCO_3 + HTFSI = Ca(TFSI)_2 + CO_2 + H_2O$

After confirming that calcium carbonate was completely reacted, water and carbon dioxide were removed by a rotary evaporator under reduced pressure to obtain white calcium bistrifluoromethanesulfonimide. The obtained calcium bistrifluoromethanesulfonimide was dried in a vacuum at 220° C. for eight hours to obtain absolute calcium bistrifluoromethanesulfonimide.

The obtained calcium bistrifluoromethanesulfonimide was dissolved in each of the organic solvents: propylene carbonate (PC), a mixed solvent of ethylene carbonate (EC) and dimethyl carbonate (DMC) at a mixing ratio of 1:1 by volume, γ-butyrolactone (γ-BL) and butylene carbonate (BC). It was confirmed that calcium bistrifluoromethanesulfonimide could be dissolved in the solvents. Electrical conductivity of each 1 M (1 mol/l) calcium bistrifluoromethanesulfonimide solution was measured. The results are shown in Table 1. Water content of each 1 M solution was not greater than 100 ppm.

Calcium bistrifluoromethanesulfonimide was added to trimethylpropylammonium-bis (trifluoromethanesulfonyl) imide (TMPA-TFSI), a molten salt. It was confirmed that calcium bistrifluoromethanesulfonimide was dissolved in TMPA-TFSI. Electrical conductivity of a 0.25 M (0.25 mol/l) calcium bistrifluoromethanesulfonimide molten salt solution was measured. The results are shown in Table 1. The electrical conductivity shown in Table 1 was measured at 25° C.

TABLE 1

| Solvent | Electrical Conductivity ($\times 10^{-3}$ Scm$^{-1}$) |
|---|---|
| PC | 2.42 |
| EC:DMC | 6.55 |
| γ - BL | 7.59 |
| BC | 1.70 |
| TMPA - TFSI | 1.53 |

As show in Table 1, the electrical conductivity of each solution was in a range of $1.53 \times 10^{-3} \sim 7.59 \times 10^{-3}$ Scm$^{-1}$. This electrical conductivity range is equal to that of a typical electrolytic solution for a lithium ion battery, i.e., 1 M LiPF$_6$ in a mixed solvent of EC and DEC at a mixing ratio of 1:1 by volume ($7.90 \times 10^{-3}$ Scm$^{-1}$). Therefore, these solutions can be used as an electrolyte for a nonaqueous battery.

ADVANTAGES OF THE INVENTION

The present invention can provide an electrolyte useful for a nonaqueous battery such as a calcium ion battery. The method of manufacturing calcium bistrifluoromethanesulfonimide used in the present invention can reduce generation of heat during a reaction to make carrying out of the reaction simple and easy and to avoid danger during the reaction.

What is claimed is:

1. An electrolyte for a nonaqueous battery comprising calcium bistrifluoromethanesulfonimide dissolved in an ammonium salt having a melting point of not greater than 60° C. or a mixture of an organic solvent and an ammonium salt having a melting point of not greater than 60° C.

2. The electrolyte for a nonaqueous battery according to claim 1, wherein the organic solvent is at least one solvent selected from the group consisting of a cyclic carbonate, a chain carbonate, a cyclic ether, a chain ether, a cyclic ester and a chain ester.

3. A nonaqueous battery comprising a negative electrode, a positive electrode and an electrolyte, wherein the electrolyte comprises calcium bistrifluoromethanesulfonimide dissolved in an ammonium salt having a melting point of not greater than 60° C. or a mixture of an organic solvent and an ammonium salt having a melting point of not greater than 60° C.

4. A nonaqueous battery comprising a negative electrode, a positive electrode and an electrolyte according to claim 3, wherein the organic solvent is at least one solvent selected from the group consisting of a cyclic carbonate, a chain carbonate, a cyclic ether, a chain ether, a cyclic ester and a chain ester.

* * * * *